United States Patent
Brandt

(10) Patent No.: US 9,894,968 B2
(45) Date of Patent: Feb. 20, 2018

(54) SUPPORT FOR CREATING LIVING JEWELRY

(71) Applicant: Adena Ruth Brandt, Escondido, CA (US)

(72) Inventor: Adena Ruth Brandt, Escondido, CA (US)

(*) Notice: Subject to any disclaimer, the term of this patent is extended or adjusted under 35 U.S.C. 154(b) by 268 days.

(21) Appl. No.: 14/841,274

(22) Filed: Aug. 31, 2015

(65) Prior Publication Data
US 2017/0055648 A1   Mar. 2, 2017

(51) Int. Cl.
*A44C 25/00*    (2006.01)
*A01G 9/02*    (2018.01)
*A01G 9/10*    (2006.01)
*A44C 7/00*    (2006.01)

(52) U.S. Cl.
CPC ............. *A44C 25/007* (2013.01); *A01G 9/02* (2013.01); *A01G 9/1026* (2013.01); *A44C 7/00* (2013.01)

(58) Field of Classification Search
CPC ..... A44C 15/003; A44C 25/00; A44C 25/007; A44C 25/001; A44C 25/002; A44C 7/00; A01G 9/02; A01G 9/1026
USPC ................... 63/1.14, 1.11; 24/5–6
See application file for complete search history.

(56) References Cited

U.S. PATENT DOCUMENTS 1,372,820 A * 3/1921 Kern ................. A45F 5/08
 24/6
1,489,140 A * 4/1924 Miner ................ A45F 5/08
 24/6

* cited by examiner

*Primary Examiner* — Jack W Lavinder
(74) *Attorney, Agent, or Firm* — Nydegger & Associates

(57) ABSTRACT

A jewelry item for supporting a living plant includes a stylized base member that is handmade from a polymer clay to resemble a whimsical article. Structurally, the jewelry item is formed with a lumen (passageway) that extends between two open ends. The living plant is preferably a tillandsia that can live in a soil-free environment, when periodically hydrated.

14 Claims, 1 Drawing Sheet

SUPPORT FOR CREATING LIVING JEWELRY

FIELD OF THE INVENTION

The present invention pertains generally to charms and articles of jewelry that can be worn or displayed. More particularly, the present invention pertains to charms and articles that support living plants during wear or display. The present invention is particularly, but not exclusively, useful as a charm or item of jewelry that includes a living plant which can live in a soil-free environment and be periodically hydrated for prolonged live, while the plant remains on the charm or item of jewelry.

BACKGROUND OF THE INVENTION

It is an observable fact that most people enjoy seeing or wearing articles and things that can be variously described as being conversational, ornamental, fanciful, whimsical, colorful, eye-catching, attractive and/or exciting. Stated differently, they often like something that is distinctive. Moreover, all people enjoy appreciating different forms of plant life and, particularly when the plant itself has many of the characteristics noted above.

As an article of jewelry, however, plant life can be somewhat problematic. One concern here, of course, is plant nutrition. Typically, plants require soil or a body of water for supporting the plant life. In either case, the incorporation of such a plant into a wearable jewelry display can pose a myriad of logistical issues. There are, however, air breathing plants (e.g. tillandsia) that will survive in a soil-free environment. Consequently, such plants can circumvent or at least minimize these logistical issues. Nevertheless, all plants, including air-breathing plants, require some degree of care. Furthermore, if used as part of an item of jewelry, their appearance, functionality and maintenance are important concerns.

In light of the above, it is an object of the present invention to provide an article of jewelry (e.g., a charm), or a display ornament (e.g. a refrigerator magnet) which incorporates a living plant. Another object of the present invention is to provide an article of jewelry which presents a living plant as part of an ornamentation wherein the plant can be hydrated for prolonged life, without being removed from the article of jewelry. Still another object of the present invention is to provide an article of jewelry with a living plant which is easy to use, is simple to maintain and is cost effective.

SUMMARY OF THE INVENTION

In accordance with the present invention a piece of jewelry (e.g. a charm, necklace, earrings, bracelet, hair barrette or broach) is provided for holding and displaying a living plant. A concern of major importance for this combination of jewelry and plant life is that the plant can be periodically hydrated, in a soil-free environment, without removing the plant from the piece of jewelry. Moreover, in this combination, the natural beauty of the plant itself, together with the artistic beauty of a handmade plant support structure (e.g. jewelry item) provide for an intriguing collaboration of artistic and utilitarian perspectives.

Structurally, the present invention includes a base member that is formed with a hollow lumen, or passageway. As formed, the lumen (passageway) extends through the base member between a first open end and a second open end. In their relation to each other, the first open end generally defines a circular cross-section having a diameter $D_1$, and the second open end likewise defines a circular cross-section having a diameter $D_2$. Preferably, $D_1$ is greater than $D_2$. Further, $D_1$ (i.e. the larger opening) needs to be sufficiently large to receive the root section of the living plant through the opening into the base member. Importantly, inside the base member, the root section of the plant will be in a soil-free environment where it can cling to a textured surface surrounding the lumen of the base member. Thus, the plant is held on the base member for exposure of the tip section of the plant.

In addition to the base member, an attachment is affixed onto the base member. As envisioned for the present invention, the attachment is to be used for engaging the base member with an object for display of the article of jewelry (e.g., charm) with the plant. For this purpose, the attachment may be any type of attachment well known in the pertinent art, such as a magnet, a clip or a wire for engagement with a hole pierced into a body portion of a person or for display as an ornament.

In other aspects of the present invention, the base member is preferably handmade of a polymer clay, and it is styled as a whimsical article to resemble such things as wildlife creatures, sea life creatures, fruits, vegetable, trees, miniature pots and fantasy characters. Also, the plant is preferably a tillandsia.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
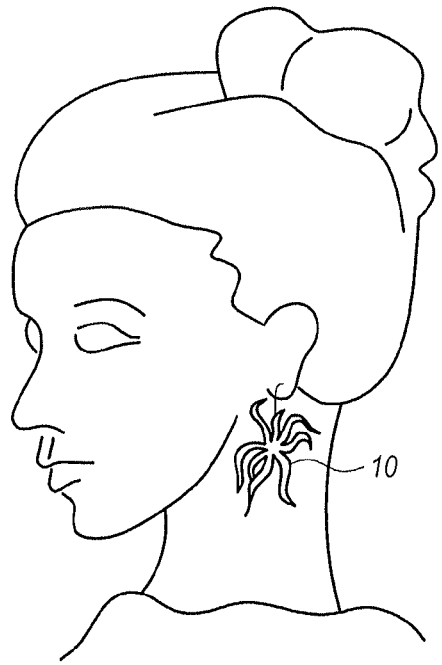
FIG. 1 is a perspective view of an earring charm in accordance with the present invention, with the earring having a unique styling, and shown while being worn by a person.

Referring initially to FIG. 1 a charm in accordance with the present invention, stylized as an earring, is shown and designated 10. For purposes of the present invention, it is to be appreciated that the charm 10 can be stylized in many different configurations as whimsical articles such as wildlife creatures, sea life creatures, fruits, vegetables, trees, miniature pots and fantasy characters. Moreover, the charms 10 can be used for various items of jewelry such as the earring 10 or as necklaces, bracelets, and broaches. The charms 10 can also be used for utilitarian purposes such as refrigerator magnets.

Figure 2:
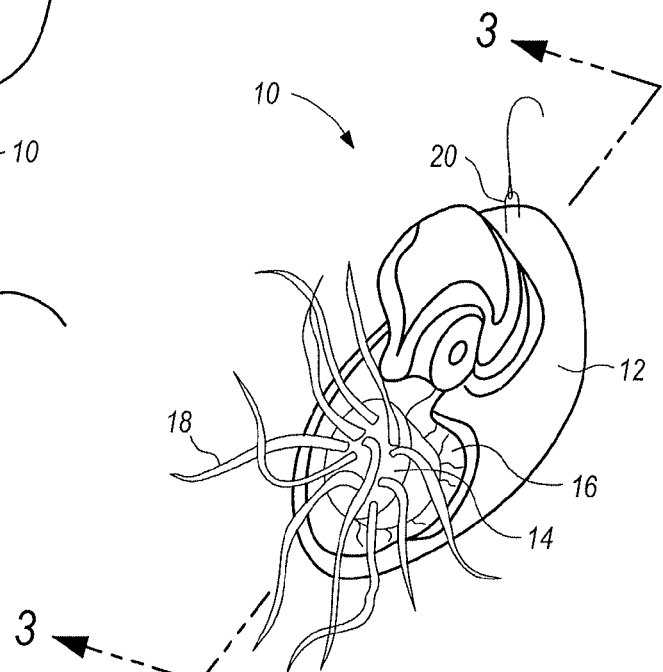
FIG. 2 is a perspective view of the present invention with an alternate earring styling and with portions broken away for clarity.

As best seen in FIG. 2, a charm 10 for the present invention will include a base member 12, in combination with a living plant 14. As shown the living plant 14 will have a root section 16 and a tip section 18. Preferably, the living plant 14 will be an air-plant, such as a tillandsia, which can live in a soil-free environment, with infrequent, but periodic, hydration. Further, FIG. 2 shows that the charm 10 will have an attachment 20 such as a wire that can be provided for engagement with a hole pierced into a body portion of a user as shown in FIG. 1 (e.g. an earring). Alternate embodiments for the attachment 20 can be any device well known in the pertinent art such as a clip, a screw or a magnetic device.

Figure 3:
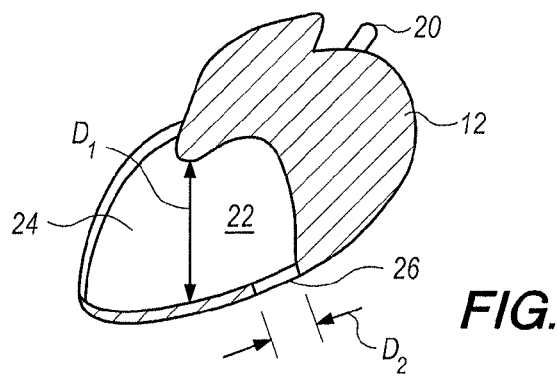
FIG. 3 is a cross-section view of the base member of the present invention as seen along the line 3-3 in FIG. 2 with the living plant removed therefrom.

In FIG. 3 it will be seen that the base member 12 is formed with a lumen (chamber) 22 that extends between a first open end 24 and a second open end 26. With reference to FIG. 3 it will be appreciated that the first open end 24 will characteristically have a circular cross-section with a diameter $D_1$. On the other hand, it will also be appreciated that the second open end 26 will have a circular cross-section with a diameter $D_2$. Typically, $D_1$ of the first open end 24 will be larger than $D_2$. As intended for the present invention, $D_1$ of the first open end 24 will be sufficiently large to receive the root section 16 of living plant 14 into the lumen (chamber) 22. Further, the interior surface of the lumen (chamber) 22 can be textured to facilitate a clinging engagement of the root section 16 with the base member 12. The consequence here is that the tip section 18 of the living plant 14 is left exposed from the first open end 24 of the base member 12 for display on the charm 10.

For a manufacture of the charm 10, the base member 12 is preferably hand styled and made of a polymer clay. For maintenance of the charm 10 it is an important aspect of the present invention that the entire charm 10, i.e. base member 12 and living plant 14 can be periodically (e.g. once a month) soaked together in water, without separating the living plant 14 from the base member 12.

While the particular Support for Creating Living Jewelry as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A charm for holding and displaying a living plant, wherein the plant has a root section and a tip section, the charm comprising:
    a base member formed with a hollow lumen, wherein the hollow lumen extends through the base member between a first open end and a second open end, and wherein the first open end defines a circular cross-section of the lumen with a diameter $D_1$, and wherein the second open end defines a circular cross-section of the lumen with a diameter $D_2$, wherein $D_1$ is greater than $D_2$, and further wherein $D_1$ is sufficiently large to receive the root section of the living plant through the first open end and into a soil-free environment inside the lumen of the base member to hold the plant on the base member for exposure of the tip section of the plant, wherein the lumen of the base member has a textured inner surface surrounding the lumen for facilitating an engagement of the root section of the plant with the base member; and
    an attachment affixed to the base member, wherein the attachment can be engaged with an object for display of the charm with the plant.

2. The charm recited in claim 1 wherein the plant is a tillandsia.

3. The charm recited in claim 1 wherein the lumen of the base member is formed with a decreasing taper from the first open end to the second open end.

4. The charm recited in claim 1 wherein the attachment is a magnet.

5. The charm recited in claim 1 wherein the attachment is a wire for engagement with a hole pierced into a body portion of a person.

6. The charm recited in claim 1 wherein the base member is made of a polymer clay.

7. The charm recited in claim 1 wherein the base member is styled to resemble a whimsical article selected from the group consisting of wildlife creatures, sea life creatures, fruits, vegetables, trees, miniature pots and fantasy characters.

8. A method for making and maintaining a charm for holding and displaying a living plant, wherein the plant has a root section and a tip section, the method comprising the steps of:
    forming a base member with a hollow lumen, wherein the hollow lumen extends through the base member between a first open end and a second open end, and wherein the first open end defines a circular cross-section of the lumen with a diameter $D_1$, and wherein the second open end defines a circular cross-section of the lumen with a diameter $D_2$, wherein $D_1$ is greater than $D_2$, and further wherein $D_1$ is sufficiently large to receive the root section of the living plant through the first open end and into a soil-free environment inside the lumen of the base member to hold the plant on the base member for exposure of the tip section of the plant, wherein the lumen of the base member has a textured inner surface surrounding the lumen for facilitating an engagement of the root section of the plant with the base member; and
    affixing an attachment to the base member, wherein the attachment can be engaged with an object for display of the charm with the plant.

9. The method recited in claim 8, wherein the lumen of the base member is formed with a decreasing taper from the first open end to the second open end.

10. The method recited in claim 8 wherein the base member is made of a polymer clay.

11. The method recited in claim 8 wherein the plant is a tillandsia.

12. The method recited in claim 8 wherein the forming step further comprises the step of styling the base member to resemble a whimsical article selected from the group consisting of wildlife creatures, sea life creatures, fruits, vegetable, trees, miniature pots and fantasy characters.

13. The method recited in claim 8 further comprising the steps of:
    soaking the charm with the plant in water overnight, once a month; and
    drying the charm with the plant for less than four hours after the soaking step.

14. The method recited in claim 8 wherein the attachment is selected from the group consisting of a magnet, a clip, and a wire for engaging the charm with a hole pierced into a body portion of a person.

* * * * *